(12) United States Patent
Freitas FOrtuna dos Santos et al.

(10) Patent No.: US 9,979,726 B2
(45) Date of Patent: May 22, 2018

(54) SYSTEM AND METHOD FOR WEB APPLICATION SECURITY

(71) Applicant: Jscrambler S.A., Oporto (PT)

(72) Inventors: Antonio Pedro Freitas FOrtuna dos Santos, Maia (PT); Rui Miguel Silvares Ribeiro, Lisboa (PT); Filipe Manuel Gomes Silva, Povoa do Varzim (PT)

(73) Assignee: JSCRAMBLER S.A., Oporto (PT)

( * ) Notice: Subject to any disclaimer, the term of this patent is extended or adjusted under 35 U.S.C. 154(b) by 34 days.

(21) Appl. No.: 14/894,912

(22) PCT Filed: Jul. 4, 2014

(86) PCT No.: PCT/IB2014/062876
§ 371 (c)(1),
(2) Date: Nov. 30, 2015

(87) PCT Pub. No.: WO2015/001535
PCT Pub. Date: Jan. 8, 2015

(65) Prior Publication Data
US 2016/0119344 A1  Apr. 28, 2016

Related U.S. Application Data

(60) Provisional application No. 61/842,994, filed on Jul. 4, 2013.

(51) Int. Cl.
*H04L 29/06* (2006.01)
*G06F 21/55* (2013.01)
*G06F 17/22* (2006.01)

(52) U.S. Cl.
CPC ...... *H04L 63/0876* (2013.01); *G06F 17/2247* (2013.01); *G06F 21/554* (2013.01); *H04L 63/1466* (2013.01); *H04L 63/168* (2013.01)

(58) Field of Classification Search
CPC ............ H04L 63/0876; H04L 63/1466; H04L 63/168; G06F 17/2247; G06F 22/554
See application file for complete search history.

(56) References Cited

U.S. PATENT DOCUMENTS 8,239,939 B2 * 8/2012 Dunagan ................. G06F 21/51
705/28
8,464,318 B1 * 6/2013 Hallak ................ H04L 63/1416
726/4

(Continued)

OTHER PUBLICATIONS

Application No. PCT/IB2014/062876, International Search Report and Written Opinion, dated May 11, 2014.

(Continued)

*Primary Examiner* — Beemnet Dada
*Assistant Examiner* — Stephen Gundry
(74) *Attorney, Agent, or Firm* — Kunzler, PC

(57) ABSTRACT

A system for detection and mitigation of client-side initiated security attack(s) to a web application is disclosed. A server component (SC) of the system is configured to intercept at least partially a web application code and/or data exchanged between a web server and one or more web browsers running on client devices respectively. The SC installs a script in the web application code intercepted from a web server before forwarding a transformed web application code to the a web browser. The CS when executed in a web browser of a client, causes the web browser to execute a loop which sweeps the document object model (DOM) structure of the webpage. Further, the CS sends a report containing the DOM structure and/or details on data to the SC. Using the received reports, SC concludes if tampering occurred at the client-side.

19 Claims, 11 Drawing Sheets

(56) References Cited

U.S. PATENT DOCUMENTS

| | | | | |
|---|---|---|---|---|
| 8,527,860 | B1* | 9/2013 | Colton | G06F 17/30893 |
| | | | | 709/203 |
| 8,683,596 | B2* | 3/2014 | Amit | G06F 21/52 |
| | | | | 709/225 |
| 8,719,451 | B1* | 5/2014 | Colton | G06F 17/3089 |
| | | | | 709/248 |
| 8,752,183 | B1* | 6/2014 | Heiderich | G06F 21/577 |
| | | | | 726/22 |
| 8,819,539 | B1* | 8/2014 | Colton | G06F 17/30902 |
| | | | | 707/755 |
| 8,914,774 | B1* | 12/2014 | Colton | G06F 9/44578 |
| | | | | 709/203 |
| 8,924,943 | B2* | 12/2014 | Wang | G06F 9/455 |
| | | | | 717/134 |
| 8,949,990 | B1* | 2/2015 | Hsieh | G06F 21/577 |
| | | | | 726/22 |
| 9,208,235 | B1* | 12/2015 | Liu | G06F 17/30864 |
| 9,231,975 | B2* | 1/2016 | Johns | H04L 63/20 |
| 9,241,004 | B1* | 1/2016 | April | G06F 21/606 |
| 9,338,143 | B2* | 5/2016 | Hansen | H04L 63/102 |
| 9,489,356 | B2* | 11/2016 | Sheretov | G06F 17/30873 |
| 9,584,543 | B2* | 2/2017 | Kaminsky | H04L 63/168 |
| 9,602,534 | B2* | 3/2017 | Decime | H04L 63/1441 |
| 2007/0016949 | A1* | 1/2007 | Dunagan | G06F 21/51 |
| | | | | 726/22 |
| 2009/0063500 | A1 | 3/2009 | Yanhong et al. | |
| 2009/0070663 | A1* | 3/2009 | Fan | G06F 21/562 |
| | | | | 715/234 |
| 2009/0070869 | A1* | 3/2009 | Fan | G06F 21/51 |
| | | | | 726/22 |
| 2009/0138937 | A1* | 5/2009 | Erlingsson | H04L 63/1416 |
| | | | | 726/1 |
| 2009/0327411 | A1* | 12/2009 | Dang | H04L 63/123 |
| | | | | 709/203 |
| 2010/0180330 | A1* | 7/2010 | Zhu | G06F 21/335 |
| | | | | 726/10 |
| 2010/0186089 | A1* | 7/2010 | Fu | G06F 21/53 |
| | | | | 726/23 |
| 2011/0015917 | A1* | 1/2011 | Wang | G06F 9/455 |
| | | | | 703/23 |
| 2011/0138174 | A1* | 6/2011 | Aciicmez | G06F 21/6272 |
| | | | | 713/165 |
| 2011/0197177 | A1 | 8/2011 | Rajesh | |
| 2011/0252305 | A1 | 10/2011 | Mirko et al. | |
| 2013/0055397 | A1* | 2/2013 | Amit | H04L 63/1441 |
| | | | | 726/25 |
| 2013/0091578 | A1* | 4/2013 | Bisht | G06F 21/53 |
| | | | | 726/25 |
| 2013/0111595 | A1* | 5/2013 | Amit | G06F 21/52 |
| | | | | 726/25 |
| 2013/0185350 | A1* | 7/2013 | Wicker | G06F 21/54 |
| | | | | 709/203 |
| 2013/0185623 | A1* | 7/2013 | Wicker | G06F 21/54 |
| | | | | 715/234 |
| 2014/0075563 | A1* | 3/2014 | Simpson | G06F 21/577 |
| | | | | 726/25 |
| 2014/0101446 | A1* | 4/2014 | Lekies | H04L 9/3226 |
| | | | | 713/169 |
| 2014/0101447 | A1* | 4/2014 | Lekies | H04L 9/0841 |
| | | | | 713/169 |
| 2014/0129920 | A1* | 5/2014 | Sheretov | G06F 17/30873 |
| | | | | 715/234 |
| 2014/0215605 | A1* | 7/2014 | Decime | H04L 63/1441 |
| | | | | 726/22 |
| 2014/0282464 | A1* | 9/2014 | El-Gillani | G06F 8/61 |
| | | | | 717/168 |
| 2014/0282872 | A1* | 9/2014 | Hansen | H04L 63/102 |
| | | | | 726/3 |
| 2014/0283038 | A1* | 9/2014 | Call | H04L 63/1441 |
| | | | | 726/22 |
| 2014/0283068 | A1* | 9/2014 | Call | H04L 63/1425 |
| | | | | 726/23 |
| 2015/0007251 | A1* | 1/2015 | Johns | H04L 63/20 |
| | | | | 726/1 |
| 2015/0095763 | A1* | 4/2015 | Wang | G06F 9/455 |
| | | | | 715/234 |
| 2015/0350243 | A1* | 12/2015 | Call | H04L 63/1441 |
| | | | | 726/23 |
| 2016/0088015 | A1* | 3/2016 | Sivan | H04L 29/06 |
| | | | | 726/23 |
| 2016/0359871 | A1* | 12/2016 | Hansen | H04L 63/102 |
| 2017/0093925 | A1* | 3/2017 | Sheretov | H04L 63/20 |
| 2017/0171168 | A1* | 6/2017 | Reshadi | H04L 63/0428 |

OTHER PUBLICATIONS

Heiderich, Mario, "Towards Elimination of XSS Attacks with a Trusted and Capability Controlled DOM", Dissertation from Ruhr University, May 2012, pp. 220.

* cited by examiner

SYSTEM AND METHOD FOR WEB APPLICATION SECURITY

FIELD OF DISCLOSURE

The present disclosure relates to web applications, more specifically, the present disclosure relates to security of web applications.

BACKGROUND

One of the major concerns today may be web application security attacks that mostly target the client-side of web applications. The security attacks may target the web-browser and the web application code that runs on the client-side. The attacks may include for example, man-in-the-browser (MITB) problem where a trojan/malware may have been installed insidiously on a victim's computer/browser and may maliciously tamper with a web application code and/or data to steal credentials, commit fraud, steal data, or cause harm to the person and/or the web application owner and/or its users. Other types of web application security attacks that may impact the client-side of the web application code include code injection attacks (reflected cross-site scripting attacks, document object model (DOM)-based cross-site scripting attacks or cross-site request forgery), data theft or data leakage attacks.

Some of the above mentioned security threats can be counteracted by using a number of different security solutions such as anti-virus, anti-malware, fraud-screening solutions, etc., running on one or more of a server or client and/or optionally, running one or more vulnerability scanning solutions to find and fix security vulnerabilities. However, these may be isolated measures prone to failure of detection and mitigation of the aforementioned attacks and require cooperation of an end user which may not work.

Thus, there is a need for a solution that ensures the security of web applications.

SUMMARY OF THE DISCLOSURE

The present disclosure obviates the above drawbacks and provides a system and method to detect and mitigate security threats to web applications. In an embodiment, one or more security threats to one or more web applications at a client device may be detected and mitigated.

In accordance with one embodiment of the present disclosure, a method for generating a transformed web application code is disclosed. The method includes intercepting a web application code and embedding one or more scripts along with the intercepted web application code resulting in the transformed web application code. The one or more scripts is meant for collecting and sending one or more representations of one or more client document object model (DOM) structures of the transformed web application code at least once when executed on a client.

In accordance with another embodiment of the present disclosure, a method for detecting and mitigating security attacks on a web application code is disclosed. The method includes intercepting the web application code sent by one or more web servers, obtaining a deemed clean representation of the DOM structure of the intercepted web application code, comparing the representation of at least one client DOM structure received from a client with the deemed clean representation of the DOM structure such that the representation of the client DOM structure is received subsequent to the execution of a transformed web application code on the client and determining one or more tampering events that signify one or more security threats to the transformed web application code based upon comparison.

In accordance with another embodiment of the present disclosure, a method for executing a transformed version of a web application code is provided. The method includes receiving the transformed web application code such that the transformed version includes at least the web application code and a script, executing the script to generate a loop for sweeping at least once a client document object model (DOM) structure of the web application code and transmitting the client DOM structure to one or more web servers.

In accordance with one embodiment of the present disclosure, a web application protection system is provided. The system includes an interface to intercept a web application code, and a page processing module to embed at least one script with the intercepted web application code to produce a transformed web application code such that the script triggers a loop to collect and send the representation of one or more client document object model (DOM) structures of a transformed web application code at least once when executed on a client.

In accordance with another embodiment of the present disclosure, a web application protection system for detecting and mitigating security attacks on a web application code includes an interface to intercept the web application code sent by one or more web servers, a clean document object model (DOM) builder module to build a deemed clean representation of the DOM structure of the intercepted web application code, and a detection engine to compare the representation of one or more client DOM structures received from a client with the deemed clean representation of the DOM structure. The representation of the client DOM structure is received subsequent to the execution of a transformed web application code on the client. The detection engine determines one or more tampering events that signify one or more security threats to the transformed web application code based upon the comparison.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the disclosure is not limited to specific methods and instrumentalities disclosed herein. Moreover, those in the art will understand that the drawings are not to scale. Wherever possible, like elements have been indicated by identical numbers.

DESCRIPTION

Figure 1A:
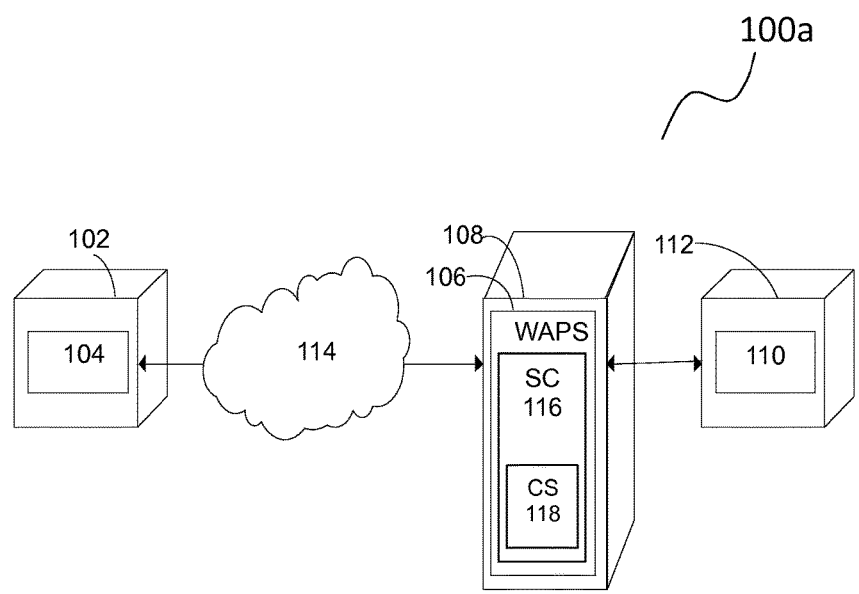
FIGS. 1(a) and 1(b) illustrate exemplary environments where the teachings of the disclosure may be implemented.

For the purpose of promoting an understanding of the principles of the disclosure, reference will now be made to the embodiments illustrated in the drawings and specific language will be used to describe the same. It will be understood by those skilled in the art that the foregoing general description and the following detailed description are exemplary and explanatory of the disclosure and are not intended to be restrictive thereof.

Many of the functional units described in this specification have been labeled as modules, in order to more particularly emphasize their implementation independence. For example, a module may be implemented as a hardware circuit comprising custom very large scale integration circuits or gate arrays, off-the-shelf semiconductors such as logic, chips, transistors, or the other discrete components. A module may also be implemented in programmable hardware devices such as field programmable gate arrays, programmable array logic, programmable logic devices or the like. Modules may also be implemented in software for execution by various types of processors. An identified module of an executable code may, for instance, comprise one or more of a physical or logical blocks of computer instructions which may, for instance, be organised as an object, procedure, or function. Nevertheless, the executables of an identified module need not be physically located together, but may comprise disparate instructions stored in different locations which, when joined together, comprise the module and achieve the stated purpose for the module. Indeed, a module of an executable code could be a single instruction, or many instructions, and may even be distributed over several different code segments, among different programs, and across several memory devices. Similarly, operational data may be identified and illustrated herein within modules, and may be embodied in any suitable form and organised within any suitable type of data structure. The operational data maybe collected as a single data set, or may be distributed over different locations including over different member disks, and may exist, at least partially, merely as electronic signals on a system or network.

Reference throughout this specification to one embodiment", an embodiment" or similar language means that a particular feature, structure, or characteristic described in connection with the embodiment is included in at least one embodiment of the present disclosure. Thus, appearances of the phrase in one embodiment", in an embodiment" and similar language throughout this specification may, but do not necessarily, all refer to the same embodiment.

The present disclosure provides a web application protection system for detection and mitigation of one or more client-side initiated security attacks to a web application code. The system includes without limitation a server component (SC) and a client-side script (CS, also referred to as 'script'). In an embodiment, the SC is configured to intercept directly or indirectly at least partially the web application code and/or data exchanged between one or more web servers and one or more web browsers running on respective client devices (also referred to as 'clients'). A web application includes without limitation, a webpage, a mobile application, a game, a wearable device application, a smartwatch application, a web service, etc. The SC installs the CS in the web application code intercepted from the one or more web servers before forwarding a transformed web application code to the one or more web browsers. The CS may be a program/script written in for example, JavaScript, cascading style sheets (CSS), hypertext markup language (HTML), etc. In an embodiment, CS may be previously mixed or concatenated with one or more codes used in the web application code.

The CS when executed in the one or more web browsers of the clients, causes the web browser to execute a loop which sweeps the document object model (DOM) structure of the transformed web application code. Further, the CS sends one or more reports containing a representation of the client DOM structure and/or details on data (e.g. credit card numbers, social security numbers) to the SC. Using the received reports, the SC concludes if tampering occurred at the client. In an embodiment, the SC concludes tampering occurred if it detects changes to the DOM structure and/or data. In addition and optionally, the SC classifies each tamper incident and notifies via for example, a web-hook, a web socket, etc., one or more of for example, the web application server(s), client, etc allowing them to react promptly to the incidents. Further, the CS may contain instructions that when executed in the web browser present a warning. In an embodiment, the CS may be enabled to display a visual warning on the client based on the response from the SC after sending one or more reports to the SC.

Reference is now made to FIG. 1(*a*), which illustrates an exemplary environment 100*a* in which the teachings of the present disclosure may be practiced. The environment includes a web browser 104 running on a client 102 that establishes communication with a web application 110 located on a web server 112 via a reverse proxy server 108, through a network 114. For ease of understanding, single hardware elements like client, web server, reverse proxy, etc are depicted in FIG. 1(*a*), however, it would be apparent to a person skilled in the art that several such elements may be employed as per the teachings of the present disclosure.

Client 102 may be a computing device such as a wireless telephone, a personal computer, a personal digital assistant (PDA), a laptop, a tablet or another type of computation and/or communication device, a thread or process running on one of these devices, and/or an object executable by one of these devices. Web server 112 may include a computational device for example a dedicated computer that responds to the requests of one or more clients 102 and has data processing capability. Client 102 and reverse proxy server 108 may connect to network 114 via wired, wireless, optical or any other type of connection that allows communication. Similarly, the reverse proxy server 108 and the web server 112 may connect via wired, wireless, optical or any other type of connection that allows communication. The web application 110 may be any computer-based software application or webpage that may be hosted by web server 112 and accessed by client 102 via computer network 114, such as the Internet.

Client 102 may include a client software, such as the web browser 104 like Firefox, Chrome, Internet Explorer, etc. In a typical scenario, a user of client 102 using web browser 104 may send a request for a web application (by URL, link within an email, link within a web page, or otherwise) to a known server 112. In an embodiment, the communication may be established using an Internet Protocol for example, an hypertext transfer protocol (HTTP)/hypertext transfer protocol secure (HTTPS), file transfer protocol (FTP), etc.

Client 102 may receive a transformed web application via the network 114 from the server 112 (or other repository). The transformed web application can be in one or more of for example, a JavaScript code, an HTML code, CSS, etc and generated as per the teachings of the present disclosure.

Server 112 may operate as a web server and host one or more web applications 110. Examples of server 112 include application server, web server, gaming server, etc. In an embodiment, the web server 112 may receive a client request via the reverse proxy server 108 and send its response to the client 102 via the reverse proxy server 108. Alternately, the server 112 may receive a client request directly and send its response to the client 102 via the reverse proxy server 108.

Figure 3A:
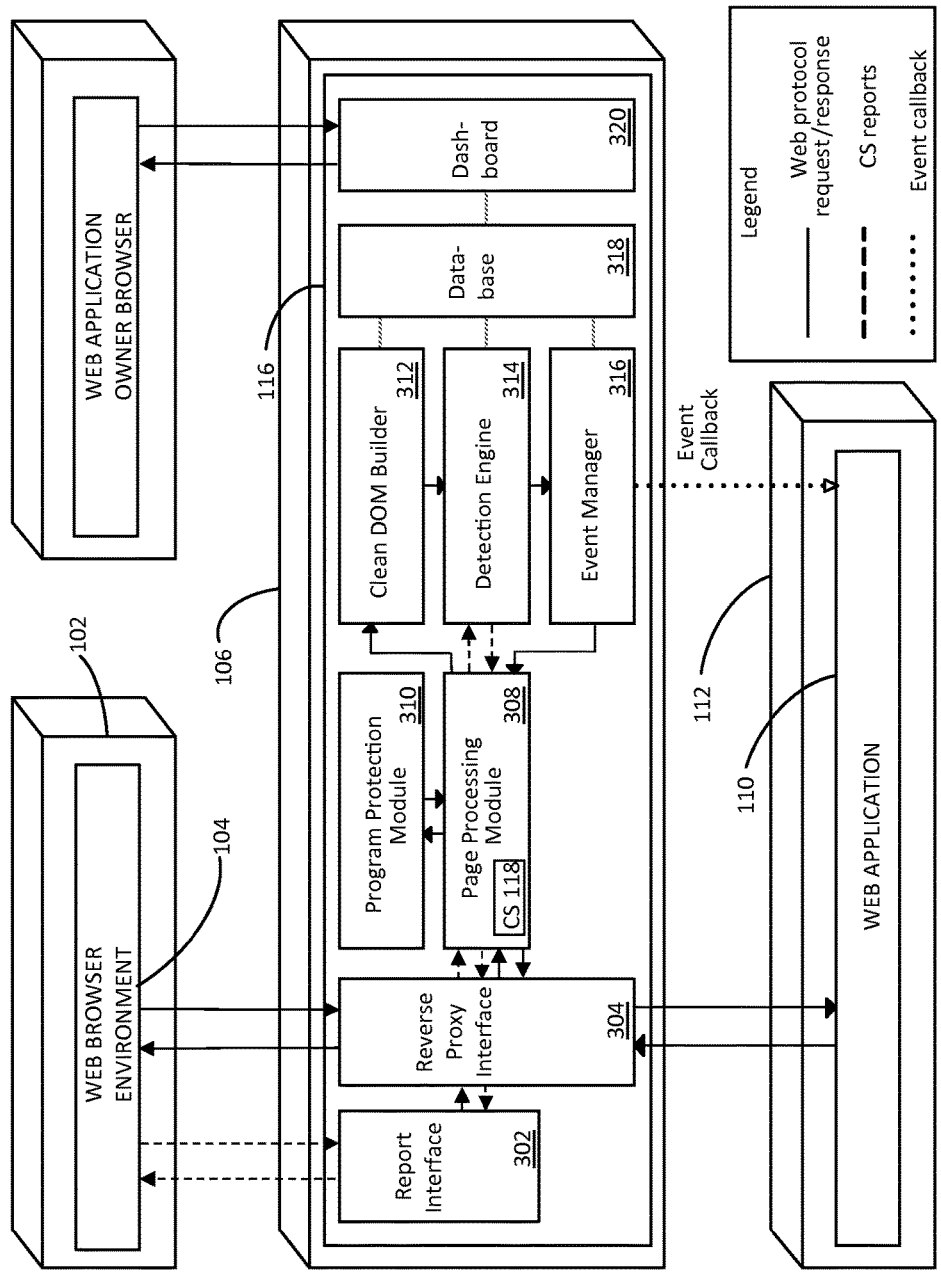
FIGS. 3(a) and 3(b) illustrate exemplary block diagrams of a server component of a web application protection system in accordance with embodiments of the present disclosure.

A reverse proxy server 108 is a server with data processing and communication capabilities on which the teachings of the present disclosure are implemented. The reverse proxy server 108 includes a web application protection system (WAPS) 106 that in turn contains at least a server component (SC) 116 and a client-side script (CS) 118. The SC 116 transparently intercepts some or all web application code and/or data exchanged between the web browser 104 and web server 112. SC 116 concatenates or embeds the CS 118 with the intercepted web application code thereby, generating a transformed web application code as per the teachings of the present disclosure described further in FIG. 3(*a* & b). Further, SC 116 may generate a protected version of one or more of the intercepted web application code, transformed web application code or both. In various embodiments, SC 116 may be located on the same infrastructure, same premises or in front of a web server. Alternately, SC 116 may be placed at a geographic location different from that of the web server 112 in which case, rather than the reverse-proxy server, a collaborating proxy server exists as depicted in the environment 100*b* of FIG. 1(*b*).

As shown in the FIG. 1(*b*), the web browser 104 running on the client 102 may establish communication with the web application 110 hosted on the server 112 via a collaborating proxy server 120 through the network 114. The collaborating proxy server 120 may communicate with the web application protection system (WAPS) 106 on which the teachings of the present disclosure may be implemented. Examples of collaboration proxy server include without limitation, SC 116 being co-located or in-front of a web infrastructure element, such as web application firewalls (WAF), load balancers, or application proxies of any kind.

The server component 116 may not intercept the web application code and/or data directly, rather may rely on the collaborating proxy server 120 for intercepting the web application code and/or data. The collaborating proxy server 120 may capture and forward the web application code and/or data to the server component 116. In each response sent to the web browser 104, the SC 116 may concatenate or embed the CS 118 written using JavaScript or other language with the intercepted web application code. At the client 102, when CS 118 is executed in the web browser 104, CS 118 may cause the web browser 104 to execute a loop that may result in periodic sending of one or more reports (or representations) containing the client DOM structure and/or details about data to the SC 116. The data includes without limitation credit card numbers, social security numbers, person name, addresses, phone numbers, or any information that has potential financial value or might be considered a target of tampering in a fraud attempt.

It should be noted that the above two embodiments are exemplary. Other implementations of WAPS 106 that facilitate interception of the web application code and/or data exchanged between the web server 112 and client 102 and generation of a transformed web application code are within the scope of the present disclosure. For example, rather than a reverse proxy server/collaborating proxy server employed for intercepting the communication, a remote proxy server which may be a cloud based version of the service may be used. In such scenario, the remote proxy server performs all the functions of the reverse proxy server/collaborating proxy server. Yet another exemplary implementation may be to rely on a remote proxy server, such as content delivery network (CDN), which sends the intercepted web application code to a cloud based version of the service.

Figure 2:
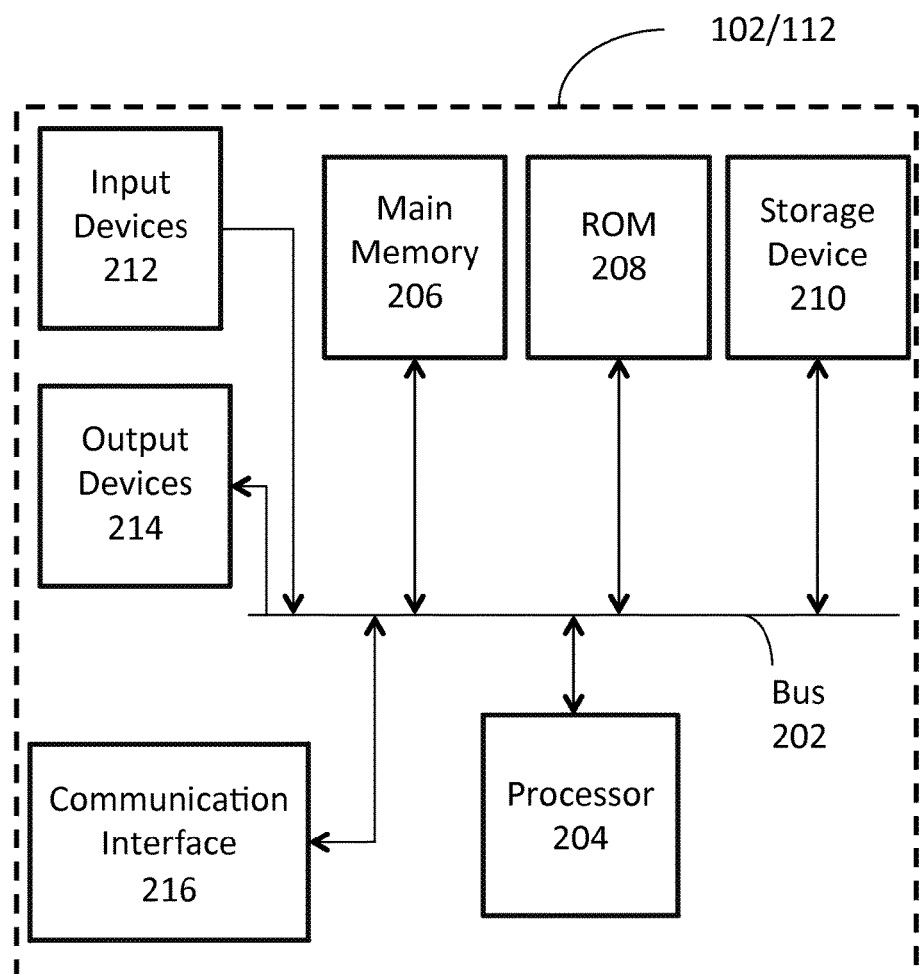
FIG. 2 is an exemplary diagram of a client or server according to an implementation consistent with the principles of the disclosure.

FIG. 2 is an exemplary diagram of a client 102 or server 112 according to an implementation consistent with the principles of the present disclosure. Client/server 102/112 may include a bus 202, a processor 204, a main memory 206, a read only memory (ROM) 208, a storage device 210, one or more input devices 212, one or more output devices 214, and a communication interface 216. Bus 202 may include one or more conductors that permit communication among the components of client/server 102/112.

Processor 204 may include any type of conventional processor or microprocessor, or a combination of processors, that interprets and executes instructions. Main memory 206 may include a random access memory (RAM) or another type of dynamic storage device that stores information and instructions for execution by processor 204. ROM 208 may include a conventional ROM device or another type of static storage device that stores static information and/or instructions for use by processor 204. Storage device 210 may include a magnetic and/or optical recording medium and its corresponding drive.

Input device(s) 212 may include one or more conventional mechanisms that permit a user to input information to client/server 102/112, such as a keyboard, a mouse, a pen, a touch screen, voice recognition and/or biometric mechanisms, etc. Output device(s) 214 may include one or more conventional mechanisms that output information to the user, including a display, a printer, a speaker, etc. Communication interface 216 may include any transceiver-like mechanism that enables client/server 102/112 to communicate with other devices and/or systems. For example, the communication interface 216 may include mechanisms for communicating with another device or system via a network, such as network 114.

The software instructions defining web application protection system 106 and/or browser software 104 may be read into memory 206 from another computer-readable medium, such as data storage device 210, or from another device via communication interface 216. The software instructions contained in memory 206 causes processor 204 to perform processes that will be described later. Alternatively, hardwired circuitry may be used in place of or in combination with software instructions to implement processes consistent with the principles of the disclosure. Thus, implementations consistent with the principles of the disclosure are not limited to any specific combination of hardware circuitry and software.

FIG. 3(*a*) illustrates the block diagram of the server component 116 of the web application protection system 106 in communication with various elements of FIG. 1(*a*) in accordance with an embodiment of the present disclosure. The server component 116 includes various modules without limitation, a report interface 302, a reverse-proxy interface 304, a page processing module 308, a program protection module 310, a clean DOM builder 312, a detection engine 314, an event manager 316, a database 318 and a dashboard 320. The WAPS 106 of this embodiment may be hosted on the reverse proxy server 108 as explained in FIG. 1(*a*).

The reverse-proxy interface 304 may intercept the web application code and/or data exchanged between the web browser 104 and web application 110. For example, the reverse-proxy interface 304 intercepts the web application code from the server 112 to the web browser 104. The web application code and/or data may be exchanged via web protocols for example, HTTP, HTTPS, FTP, etc. The web application code includes without limitation, code for a webpage, code for a program of a webpage, entire web application code, code for a mobile application, code for a game, code for a wearable device application, code for a smartwatch application, code for a web service etc.

The page processing module 308 identifies for example, a web application or a segment of a web application to which the intercepted web application code corresponds. As another example, the module 308 may identify one or more programs included in the web application code that were served by the server 112. In an embodiment, the page processing module 308 may use the uniform resource locator of the intercepted web application code for identification. The programs may be in JavaScript or other language. The page processing module 308 may make one or more adjustments to the intercepted web application code and/or a protected version of the web application code, and return a transformed web application code to the reverse-proxy interface 304. There may be numerous examples of the adjustments made to the intercepted web application code and/or protected version of the web application code. For example, the page processing module 308 may concatenate or embed CS 118 in the intercepted web application code and/or protected version of the web application code to generate a transformed version to be sent to the client 102 via the reverse proxy interface 304. Further, the module 308 may send a copy of the transformed version to the clean DOM builder module 312. As another example of the adjustment made by the module 308, the page processing module 308 may install one or more challenge tokens in the CS 118 and then concatenate or embed this modified CS with the intercepted web application code and/or protected version of the web application code to generate a transformed web application code. Absence of this challenge token in messages received from the client 102 subsequently for example, POST or GET messages, may generate an alarm or a visual warning. This mechanism is used to preclude attacks and/or make it difficult for automated attacks to succeed.

Yet another example of the adjustment made by the module 308 includes inserting one or more unique identifier (UID) and/or challenge token(s) in the CS and thereafter, concatenating or embedding this CS (with UID and/or challenge token) with the intercepted web application code and/or protected version of the web application code to generate a transformed web application code. The UID may be randomly generated using a publicly known or unknown algorithm. Presence of the UID in each report received by the server component 116 from the client 102 is checked to determine tampering of the web application code running at the client 102. Also, this mechanism may provide an easy way to detect attempts to reuse the same CS 118 (i.e. replay attacks). Further, because UIDs may be previously generated and stored, attempts to spoof new UIDs can be easily detected. It will be appreciated that other examples of generating a transformed web application code containing the CS are within the scope and spirit of the present invention.

The page processing module 308 may also protect the transformed web application code by for example, encrypting or obfuscating the transformed web application code. Once the CS is executed on the client 102, the module 308 may receive one or more reports containing client DOM structure of the web application code at the client via the interface 304 and forward the same to the detection engine 314.

The page processing module 308 may also be configured to specify the type of protection required to be performed on the intercepted web application code by the program protection module 310. Alternately, the program protection module 310 may decide the type of protection and generate one or more protected versions of the intercepted web application code received via the module 308. In an embodiment, protected versions include without limitation, obfuscated versions of the web application codes, encrypted versions of the web application codes, etc. Exemplary encryption techniques include asymmetric or symmetric encryption techniques. The program protection module 310 may either generate a protected version on the fly or query the database 318 if the protected version is available. If a protected version already exists, the program protection module 310 returns the protected version after retrieving it from the database 318. For example, if one or more obfuscated versions are available, the program protection module 310 may replace the intercepted version with the obfuscated version. As an alternative, the program protection module 310 may replace the intercepted version with a different obfuscated version of the same web application code each time it is accessed.

Exemplary obfuscation techniques for generating protected versions include without limitation, symbol renaming, member enumeration, literal hooking, dead code injection, function outlining, string splitting, function reordering, domain lock, and expiration date. The domain lock transformation may install checks all over the web application code that verify if the web application code (also referred to as 'code') is running in an allowed domain. If not, it may send a notification to the server component 116 and prevent the CS from executing further. As stated, these are only exemplary obfuscation techniques and other obfuscation techniques that can be employed to generate a protected version to be used as per the teachings of the disclosure, are within the scope of the present disclosure. Further, CS 118 code obfuscation may include security checks that may verify that the web application code is running on an expected domain. In case it is running on a different domain, it may send notifications to the report interface 302 indicating that the CS 118 code is running on an unauthorized domain.

In an embodiment, the program protection module 310 may protect the web application code multiple times which may result in different obfuscated or encrypted versions. This may enable the web application protection system 106 to display a code morphing behavior, as each request to a given page, may appear to have a different program. This may further help in precluding attack automation, as it may be difficult for an attacker to know the final form of the program to disarm. Alternately, the program protection module 310 may provide program obfuscation protections that may change the order of a source code of the web application code when mixing different programs together, such as CS 118 and other existing programs in the web application code, and apply these protections to them. This may scatter the code of each script, making it even more difficult to disarm or remove the CS 118 without breaking other programs.

Optionally, on request of the page processing module 308, the program protection module 310 may convert a program from one language to another. For example, the program protection module 310 may fully or partially convert an HTML code present in the web application code to an equivalent JavaScript. The HTML element ID and CLASS names may, depending on user configurable parameters, be renamed by the program protection module 310. The resulting program may, depending on user configurable parameters, be mixed with other programs to generate a protected version.

The clean DOM builder module 312 is responsible for building a deemed clean representation of the DOM structure of the transformed web application code of for example, an HTTP response received by the reverse proxy server 108 from the web server 112. Further, the clean DOM builder module 312 may generate one or more variations of the deemed clean representation of the DOM structure. The variations may be caused by for example, one or more webpage events and/or program code (e.g. JavaScript) executing in the webpage at the client. In an embodiment, the clean DOM builder module 312 may merge the one or more variations that may be produced to the deemed clean representation of the DOM structure by the code in the received HTTP response. The deemed clean representation of the DOM representation may be an annotated representation of for example, the DOM structure, describing which nodes are mandatory, which nodes are optional, attributes used and possible values. All these variations may be considered valid representations of the DOM structure and its aggregation facilitates the comparison with the reports sent by the CS 118 running on the client 102.

The detection engine 314 receives the deemed clean DOM representation from the clean DOM builder module 312 and compares it with each report received from the client 102 due to CS 118 running at the web browser 104. Each difference/tamper event found maybe analyzed individually, and a threat category and/or risk score may be assigned to it. The risk score may be, for example, from 0 to 100, where 0 means no risk, and 100 means maximum risk. This classification may be performed automatically by the detection engine 314. In an embodiment, a web application owner may configure a risk threshold that must be crossed in order for an alarm to be generated or may configure threat types that the owner may be interested in viewing or being informed on the dashboard 320. The difference/tamper events include without limitation, injections in HTML element content, injections in element attributes, injection of JavaScript scripts, injection of new HTML elements, removal of HTML elements, removal of JavaScript, etc.

In an embodiment, the detection engine 314 may tolerate differences found in comparison of the deemed clean version of the web application code and the one or more representations of the client DOM structure. Such differences may be a result of the deemed clean version of the web application code being executed in a different web browser and/or version at the client or not having installed well-known web browser plugins which the client may have, etc. The detection engine 314 may integrate detailed information about known differences between different web browsers and versions. In one embodiment, a very low risk factor is assigned to express tolerance. To assign a low risk factor, the detection engine 314 may use a list that includes differences produced by well-known browser plugins. The list of differences known to be produced by well-known browser plugins may be shared between different installations of the server component 116 protecting different web applications and/or may result from the analysis conducted on past tamper events.

The event manager 316 receives one or more lists of tampering events from the detection engine 314, and depending on the user configuration, may notify the facilities that are interested in receiving prompt notification of those events. The facilities include without limitation database 318, other event consumers such as security information and event management software, client 102 and/or the web application that is being protected through previously configured web-hooks. With the web-hooks, the web application 110 determines specific actions required at the server 112 backend e.g. canceling transactions, suspend user account, etc.

The dashboard 320 may retrieve information from the database 318 about detected threats and actions taken. The database 318 in addition to the DOM structures, and protected version of the web application code, may store one or more samples of each intercepted response and their correlation with all the requests (e.g. each file linked from the main HTTP object triggers a new request) caused by a client action (e.g. a click).

Figure 1B:
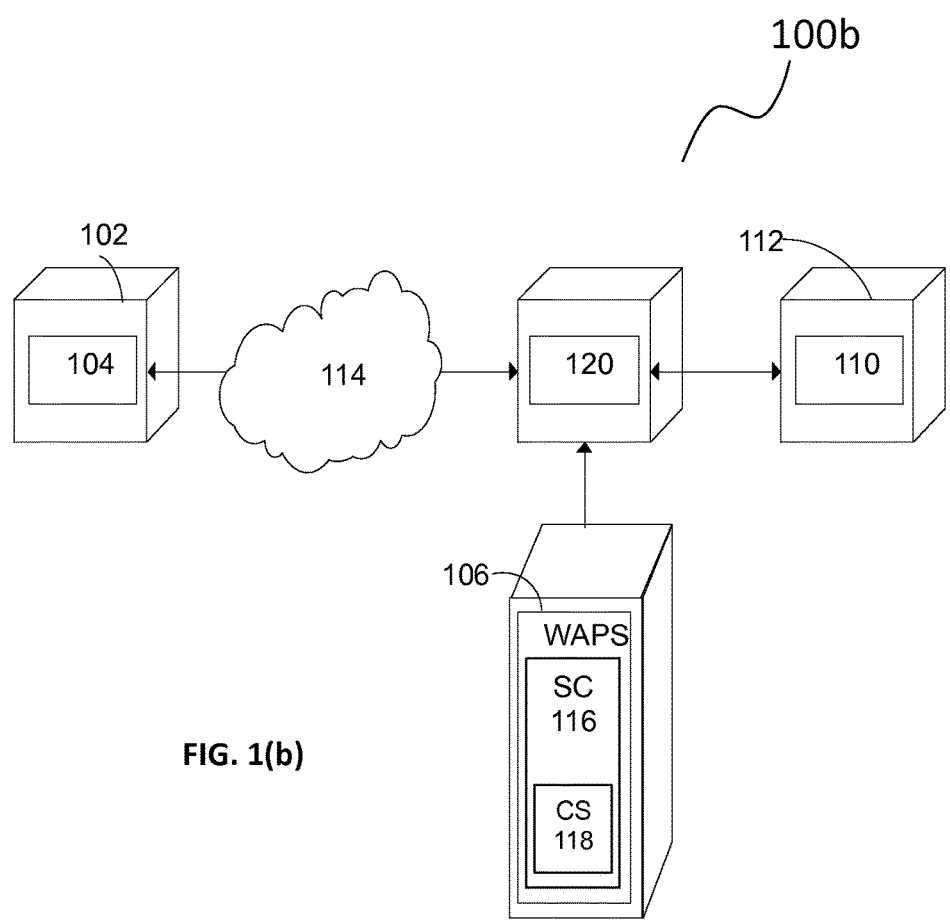
Figure 3B:
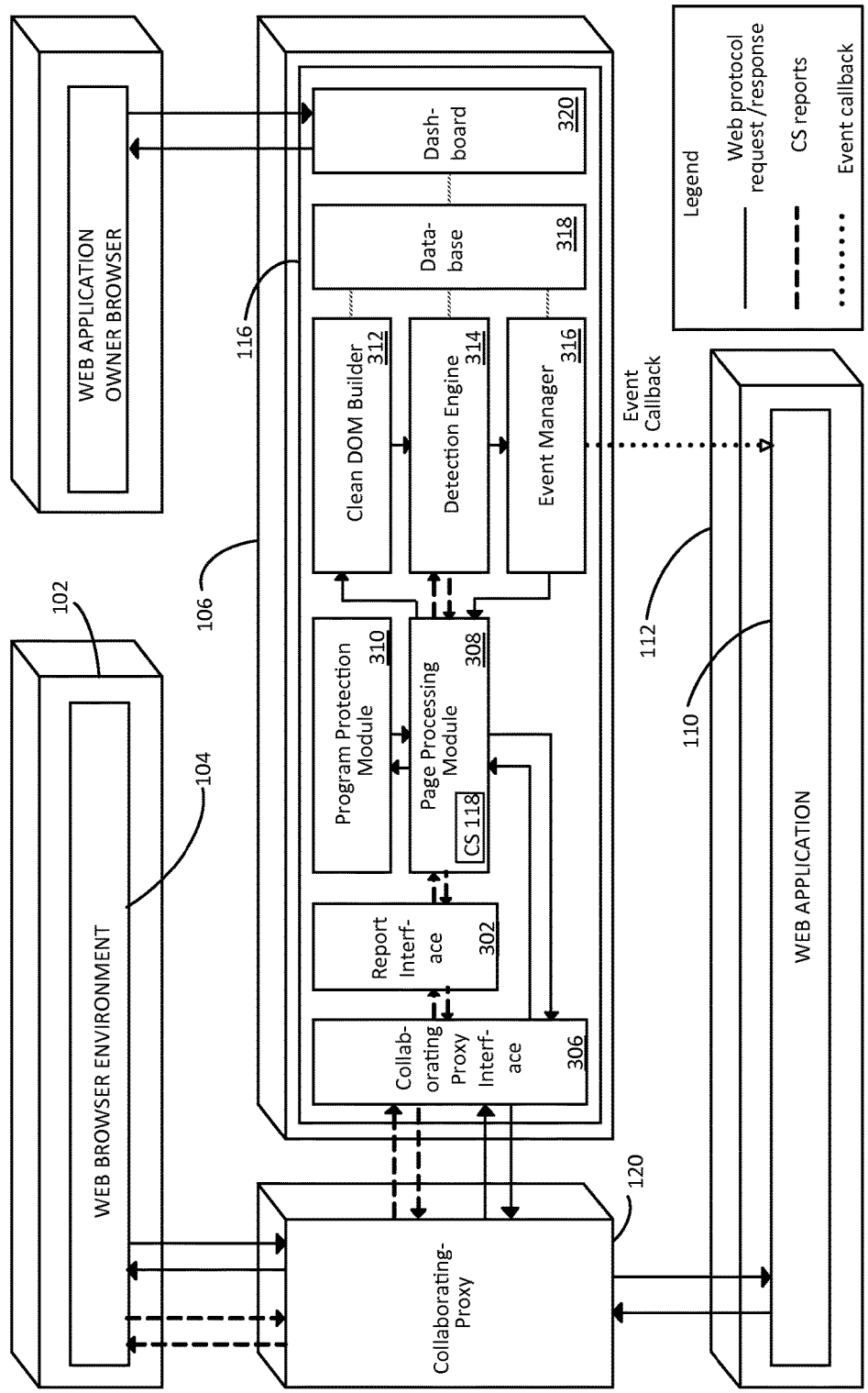

FIG. 3(b) illustrates the block diagram of the server component 116 of the web application protection system 106 in communication with various elements of FIG. 1(b) in accordance with an embodiment of the present disclosure. In the collaboration mode, the collaborating proxy server 120 may intercept the web application code and/or data exchanged between the web browser 104 and the web server 112 and send it to the collaborating-proxy interface 306 of the server component 116. The collaborating-proxy interface 306 in turn may forward the intercepted web application code and/or data to the page processing module 308. Alternately, the collaborating-proxy interface 306 may forward the transformed web application code received from the module 308 to the collaborating-proxy server 120.

In addition, the collaborating-proxy interface 306 communicates with the detection engine 314 via interface 302 and module 308 to provide one or more reports received from the client 102. The functioning of the blocks report interface 302, a page processing module 308, a program protection module 310, a clean DOM builder 312, a detection engine 314, an event manager 316, a database 318 and a dashboard 320 can be referred from the description of corresponding blocks of FIG. 3(a).

Figure 4A:
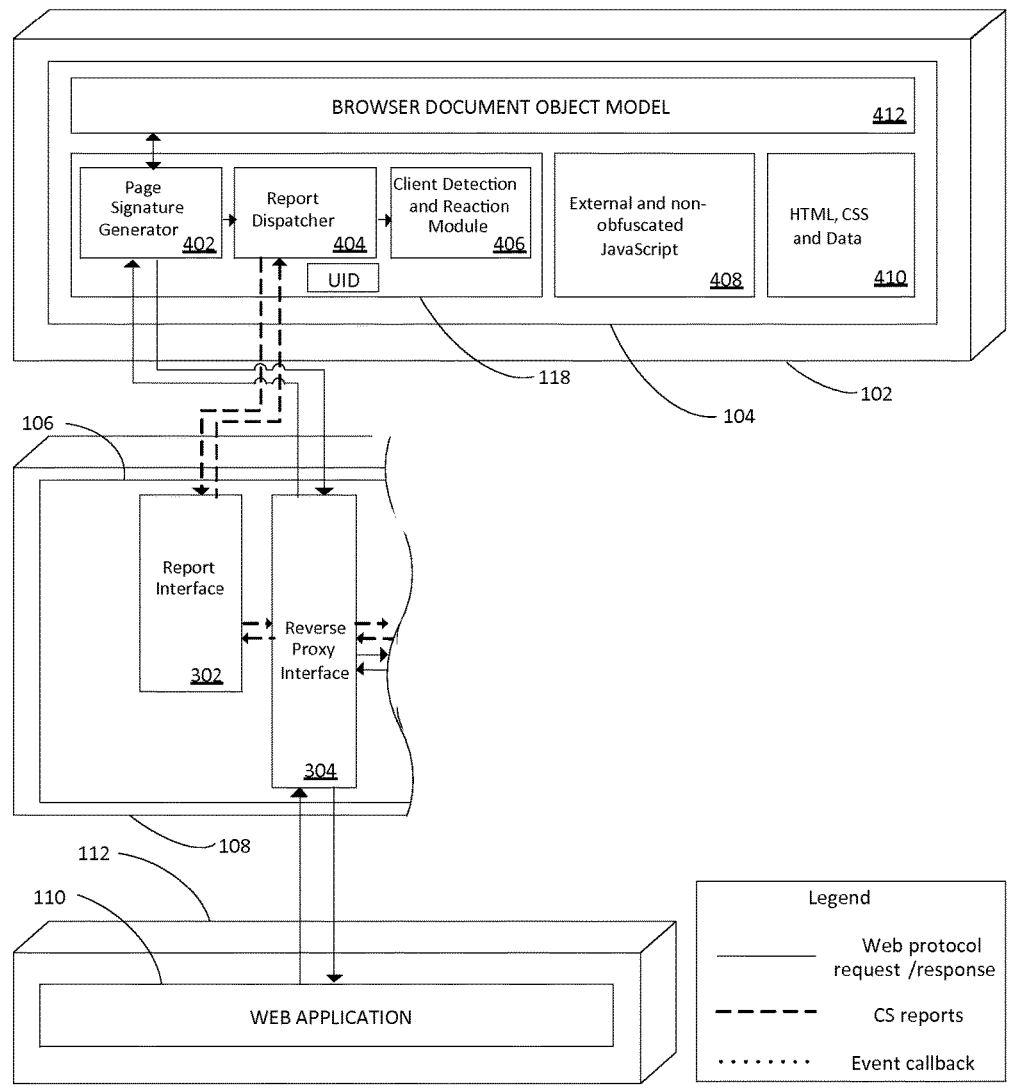
FIGS. 4(a) and 4(b) illustrate exemplary client-side depictions of the teachings of the present disclosure.

FIG. 4(a) illustrates an exemplary client-side depiction of the teachings of the present disclosure in communication with the reverse proxy server 108. The client 102 includes the web browser 104 that receives one or more of, for example, CS 118, non-obfuscated programs hosted on the web server 112 or programs loaded from external URLs (e.g. programs hosted in content delivery networks) 408, HTML, CSS and data 410 relating to the webpage and browser DOM 412 generated after the execution of the CS 118.

CS 118 includes without limitation three different modules: a page signature generator 402, a report dispatcher 404, and a client detection and reaction module 406. The page signature generator 402 reads the browser DOM 412 and generates one or more serialized representations of the DOM structure of the webpage/web application code running on the client 102.

The report dispatcher 404 transmits the one or more serialized representations of the DOM structure of the webpage to the report interface 302. The report dispatcher

404 may send the one or more reports every N seconds (N being a configurable value), during the time a user stays on a webpage. If a single report is missed by the detection engine 314 (FIG. 3(*a-b*)), an alarm may be triggered, and the web application 110 may react accordingly. Alternately, for the reports sent, the report dispatcher 404 may receive an indication from the server component 116 informing the security threats that were detected on the web page or the error that was found in the report. In an embodiment, the report dispatcher 404 executes a list of instructions that display a visual warning to the user, informing that the session might be compromised and instruct the user on what is the best course of action. Other known reporting mechanisms like alerts, pop-ups etc may be used instead of or in combination with visual warning. Alternatively, the list of instructions may trigger an action such as redirecting the current webpage to a different URL, expiring the session by deleting the session cookie or escalating it by launching a complementary security mechanism (e.g. secure browser environment).

The client detection and reaction module 406 may execute an additional list of instructions in the web browser 104 that aims to revert specific tampering threats, caused by a client-side threat e.g. trojan. The client detection and reaction module 406 may revert specific tampering events from specific threats for which tampering may become predictable (e.g. a MITB trojan that changes a web protocol response, for instance a HTTP/HTTPS response, in a predictable way). Module 406 may execute a list of instructions (e.g. an extra JavaScript code) included in the CS 118 which, when executed, may reconstruct the tampered part of the webpage so that it assumes a legitimate form.

Figure 4B:
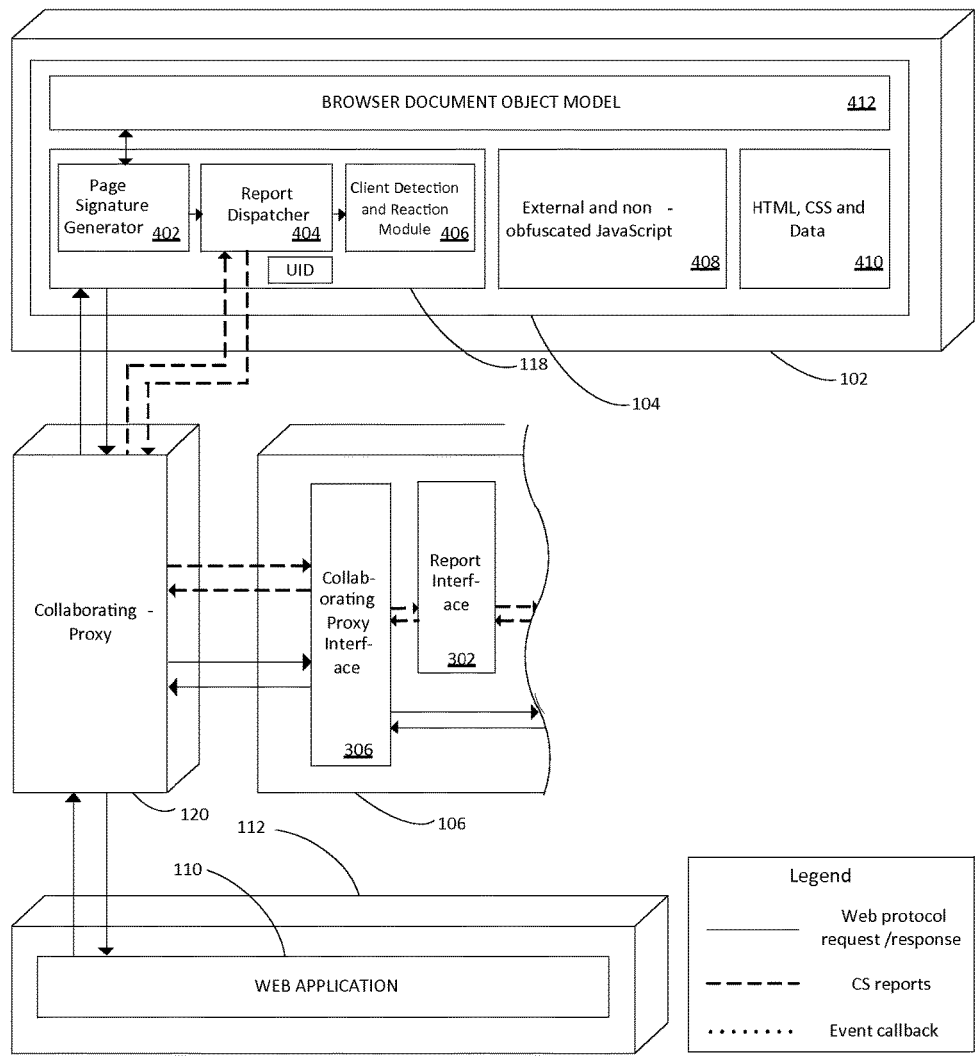

FIG. 4(*b*) illustrates an exemplary client-side depiction of the teachings of the present disclosure in communication with the collaborating proxy server 120. The blocks CS 118, non-obfuscated programs hosted on the web server 112 or external URLs (e.g. programs hosted in content delivery networks) 408, HTML, CSS and data 410 and browser DOM 412 function as explained in FIG. 4(*a*). The report dispatcher 404 transmits the one or more reports to the collaborating proxy server 120 in this embodiment.

Figure 5:
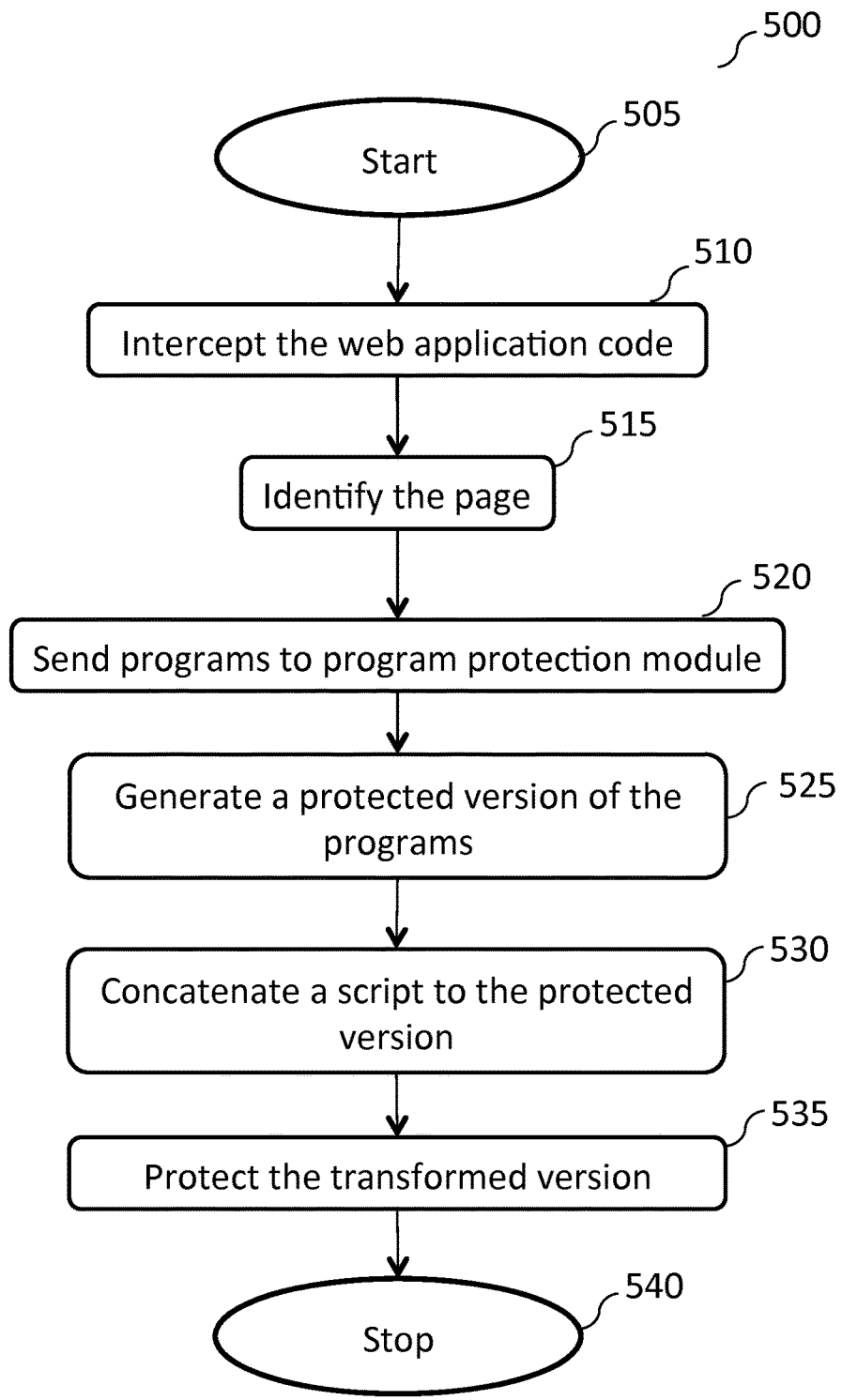
FIG. 5 is an exemplary flowchart of the method for generating a transformed web application code.

FIG. 5 is an exemplary flowchart 500 of the method for generating a transformed web application code. At step 505, the method commences. An entity (for example, the reverse proxy server, the collaborating proxy server, the remote server, etc) intercepts the web application code and/or data transmitted by the web server for the client at step 510. An interface, for example, the reverse proxy interface or the collaborating proxy interface, receives the web application code or data from the entity at and forwards it to the page processing module. The page processing module identifies at least a part of the webpage (for example, by using the uniform resource locator) to which the communication corresponds at step 515. The page processing module further identifies one or more programs included in the communication that were served by the server. Optionally, the page processing module may seek to protect the intercepted web application code (namely, the programs identified in step 515) and send the identified programs to the program protection module at step 520.

The program protection module generates a protected version of the intercepted web application code at step 525. The protected version includes one or more of an encrypted or obfuscated version of the web application code. The protected version may be encrypted or obfuscated one or more times on the fly or fetched from a database after querying the database storing one or more pre-generated obfuscated or encrypted versions. Other ways of generating protected versions include without limitation, changing order of programs, converting language of the programs, etc as described above. The protected version is forwarded to the page processing module. The page processing module concatenates or mixes the protected version/intercepted version with a CS to generate a transformed version at step 530. The page processing module may concatenate or mix the protected version/intercepted version and CS on the fly or obtain from the database in case it is pre-generated. Optionally, the page processing module may insert one or more UID and/or challenge token in the CS prior to concatenating or mixing the CS with the protected version/intercepted version. Detailed description of the UID and the challenge token are provided with reference to FIG. 3(*a*). Optionally, the page processing module encrypts or obfuscates the transformed version before sending it to the interface at step 535. Any of the known methods for encryption or obfuscation may be used. The method stops at step 540.

Figure 6:
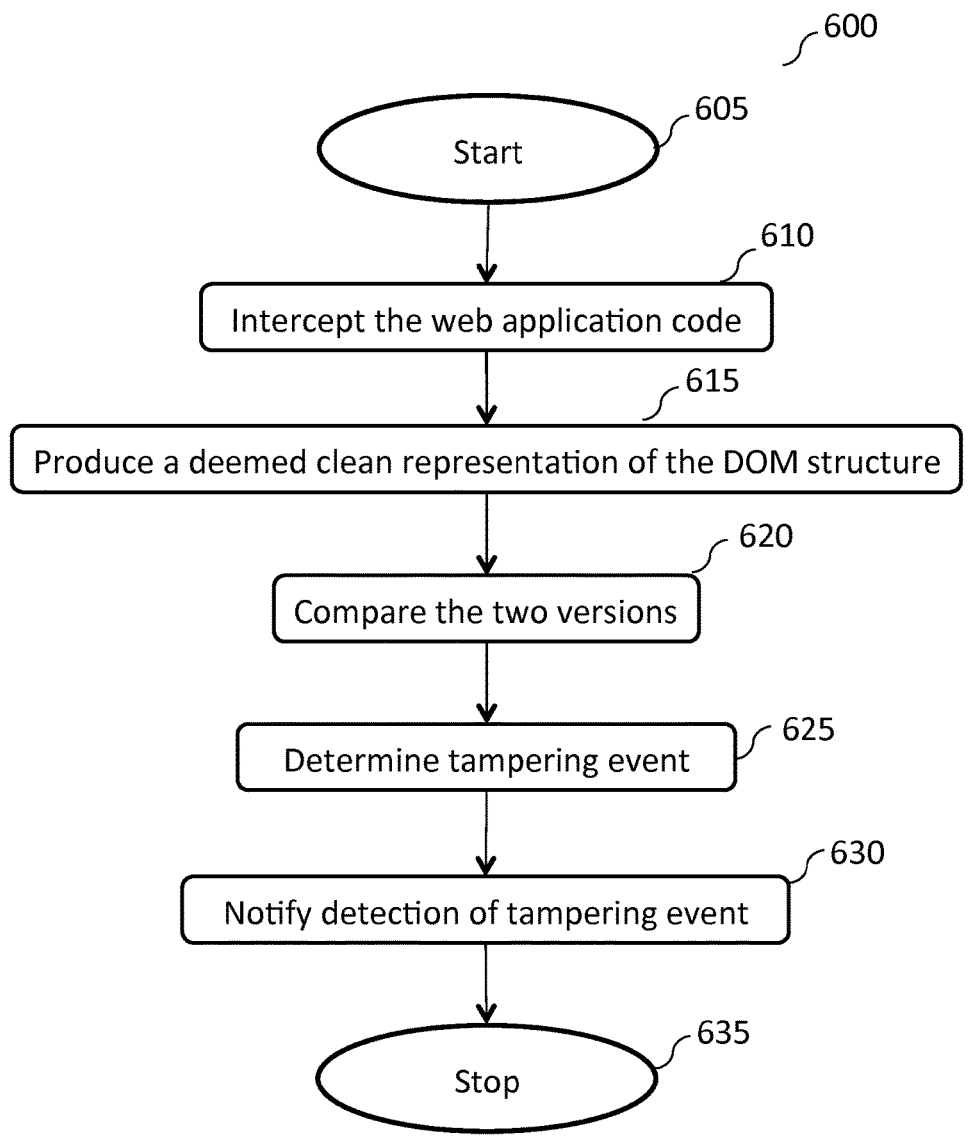
FIG. 6 illustrates a flowchart for detecting and mitigating one or more security risks to the web application code in accordance with an embodiment of the present disclosure.

FIG. 6 illustrates a flowchart 600 for detecting and mitigating one or more security risks of a web application code. The method starts at step 605. At step 610, an entity (for example, the reverse proxy server, the collaborating proxy server, the remote server, etc) intercepts the web application code and/or data transmitted by the web server for the client in response to a client request. An interface, for example, the reverse proxy interface or the collaborating proxy interface, receives the web application code or data from the entity and forwards the same to the page processing module which in turn forwards the communication to the clean DOM builder module. At step 615, the clean DOM builder module produces a deemed clean representation of the DOM structure of the intercepted/protected version of the web application code and stores the same in the database. In an embodiment, the clean DOM builder module may merge one or more variations produced to the deemed clean representation of the DOM structure of the received response as it passes through the entity before being transmitted to the client.

At step 620, the detection engine compares the client DOM structure received in each report from the client with the deemed clean representation of the DOM structure. The detection engine receives the one or more reports from the client periodically once the web application code is executed at the client. The detection engine determines one or more tampering events that signify security threat to the web application based upon comparison at step 625. The detection engine prepares one or more lists of one or more tampering events and sends the lists to the event manager which in turn notifies detection of the tampering event(s) or absence of receipt of a response, for example, an HTTP response to at least one of web server, client, or other user configured devices at step 630. Based upon configuration, it is possible that detailed information on each tampering event is provided to at least one of web server, client, or other user configured devices. In an embodiment, the notification may help in mitigating the security threat(s) by warning the user using the web application and the server in real-time. The method stops at step 635.

Figure 7:
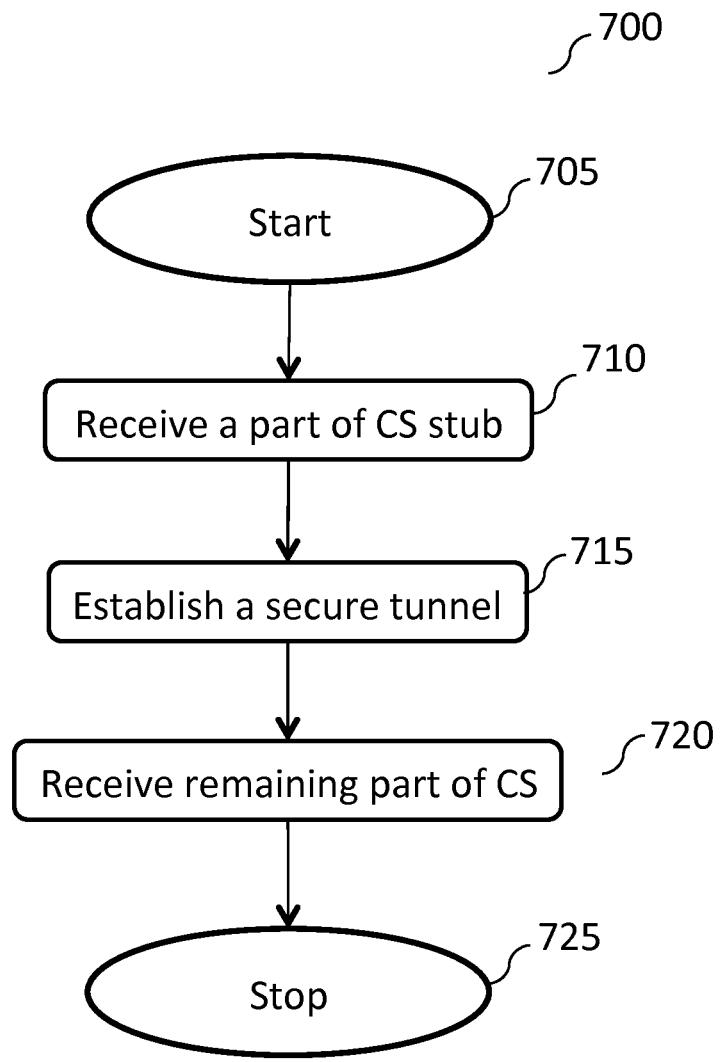
FIG. 7 illustrates a flowchart on the installation steps of a client-side script (CS) at a client in accordance with an embodiment of the present disclosure.

FIG. 7 illustrates a flowchart 700 on the installation steps of the CS at the client in accordance with an embodiment of the present disclosure. The method commences at step 705. The client receives a part of the CS stub at step 710, which the web browser executes. The CS stub may contain a list of instructions for establishing a secure tunnel with one end located inside a JavaScript runtime environment installed at the client and the other end may be provided in the program protection module. Once the instructions are executed, a secure tunnel is established at step 715. In an embodiment, the establishment of the secure tunnel may use a secure key exchange mechanism for example, the Diffie-Hellman to set a shared secret key. This shared key may then be used as a symmetric key cipher applied to all data exchanged, thus forming a secure tunnel. In step 720, remaining part of the CS stub is received at the client via the secure tunnel. The secure tunnel protects all communications, for example, the web application code and data. The method ends at step 725.

The transmission of web application code using the secure tunnel may be used to provide the CS polymorphic-like behavior, by periodically replacing the CS with a new protected version (e.g. encrypted or obfuscated version) of itself, having visible differences in the web application code form. The above method of CS installation may preclude static analysis of the CS due to a secure client-side tunnel.

Figure 8:
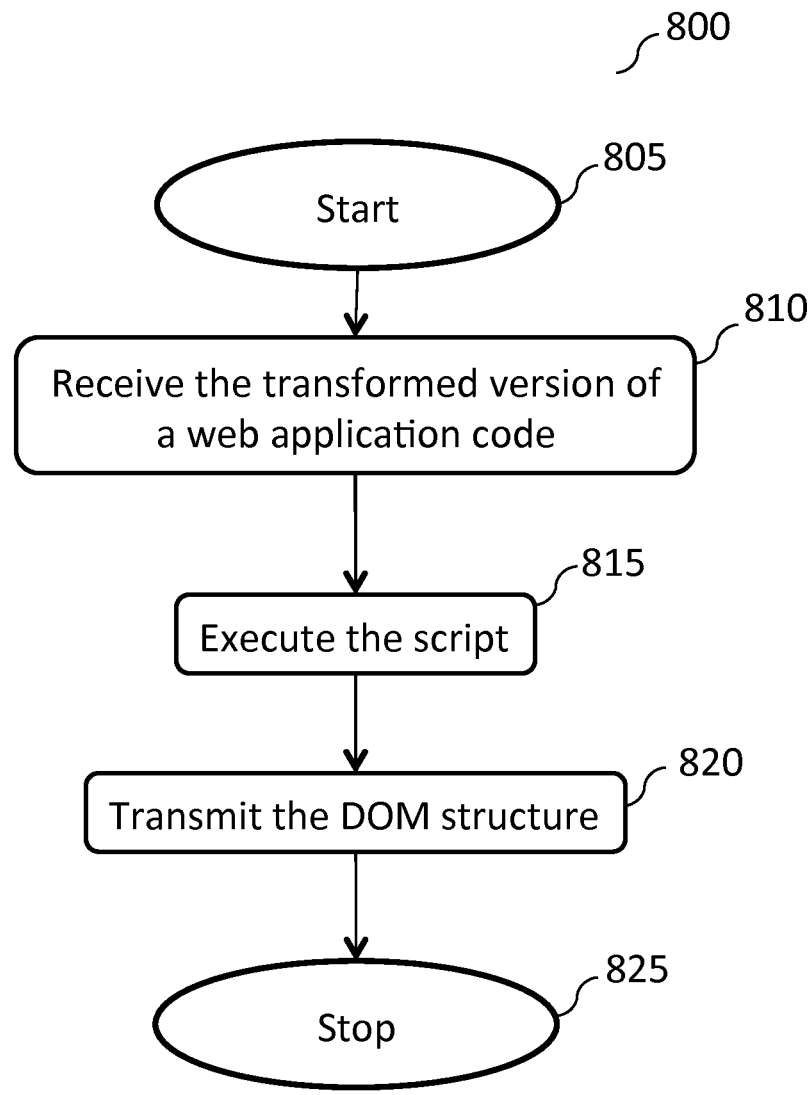
FIG. 8 illustrates a flowchart showing execution of the client-side script (CS) on the client in accordance with an embodiment of the present disclosure.

FIG. 8 illustrates a flowchart 800 showing execution of the client-side script (CS) on the client in accordance with an embodiment of the present disclosure. The method commences at step 805. The web browser of the client receives the transformed web application code at step 810. The transformed version includes a script, namely CS in the web application code. Additionally, the transformed version may include the protected version of the web application code. The web browser executes the script which in turn generates a loop for sweeping at least once a document object model (DOM) structure of the web application code at step 815. Thereafter, the web browser transmits one or more reports containing the client DOM structure to the web server at step 820. For example, the script may transmit the one or more report in a HTTP response to the web server periodically.

It is to be noted from the above description that the system in accordance with the present disclosure works transparently because it doesn't require manual integration with the web application, or does not install anything on the client nor does it require the cooperation of the web application end-user in order to perform its function. Further, the system in accordance with the teachings of present disclosure may detect DOM-based cross site scripting (XSS) as well as other types of XSS that affect the clean version of a webpage. The system can detect other types of XSS-based attacks that give origin to more advanced XSS attacks where additional code, loaded from a third-party server, is added to the webpage and generates alerts. These more advanced attacks may particularly be dangerous as they can lend remote control of the browser to an attacker.

The foregoing description of preferred embodiments of the present disclosure provides illustration and description, but is not intended to be exhaustive or to limit the disclosure to the precise form disclosed. Modifications and variations are possible in light of the above teachings or may be acquired from practice of the disclosure. For example, a web application owner may be informed of all tampering events detected and/or mitigated by the system 106. The web application owner maybe informed in full detail, of the differences found for each of those tampering events. Further, the web application owner may for example, specify a callback function, which the web application protection system 106 may use to notify the web application in order to support a desired reaction from the web application to the one or more security threats detected. Alternately, a web application owner may configure a set of regular expressions that describe data that is considered to be security sensitive. The regular expressions may then be used by the system 106 to find sensitive information in each intercepted web protocol response. Thereafter, each sensitive information found in the web protocol response may be replaced by an image file (with vector information) that contains the same information graphically. Thus, automated data harvesting or leakage may be prevented.

No element, act, or instruction used in the description of the present application should be construed as critical or essential to the disclosure unless explicitly described as such. Also, as used herein, the article "a" is intended to include one or more items. Where only one item is intended, the term "one" or similar language is used.

The invention claimed is:

1. A method for generating a transformed web application code, the method comprising:
   intercepting a web application code sent by at least one web server;
   providing at least one script;
   embedding the at least one script along with the intercepted web application code resulting in a transformed web application code, wherein the script collects and sends a representation of at least one client document object model (DOM) structure of the transformed web application code at least once when executed on a client; and
   building a deemed clean representation of the DOM structure of the transformed web application code, for comparison with the representation sent by the script at the server.

2. The method of claim 1, wherein the providing the at least one script comprises:
   installing at least one of a challenge token or a unique identification number in the at least one script; and
   protecting the at least one script with the at least one challenge token or unique identification number.

3. The method of claim 1, further comprising protecting at least partially one of the intercepted web application code, the at least one script or the transformed web application code.

4. The method of claim 3, wherein the protecting comprises at least one of obfuscating or encrypting the intercepted web application code, the at least one script or the transformed web application code one or more times.

5. The method of claim 1, further comprising installing a unique identification number in the at least one script to detect attempts to reuse the same script.

6. The method of claim 1, further comprising changing a programming language of at least a part of the intercepted web application code.

7. The method of claim 1, further comprising changing an order of one or more programs of the intercepted web application code and the at least one script.

8. The method of claim 1, wherein the script comprising a set of instructions to be executed at the client for initiating a key exchange protocol for establishing a shared secret key between the set of instructions executing on the client and a web server.

9. The method of claim 1 further comprising establishing a secure tunnel for delivery of at least one of the at least one script and/or the transformed web application code to the client.

10. The method of claim 1, further comprising:
    obtaining the deemed clean representation of a document object model (DOM) structure of the intercepted web application code;
    comparing the representation of at least one client DOM structure received from the client with the deemed clean representation of the DOM structure, wherein the representation of the at least one client DOM structure is received subsequent to the execution of the transformed web application code on the client; and determining one or more tampering events that signify one or more security threats to the transformed web application code based upon the comparison.

11. A method for executing a transformed web application code, the method comprising:

receiving the transformed web application code, wherein the transformed web application code comprises at least a web application code and a script wherein the script collects and sends a representation of at least one client document object model (DOM) structure of the transformed web application code at least once when executed on a client;

executing the script to generate a loop for sweeping at least once a client document object model (DOM) structure of the web application code; and transmitting at least one representation of the client DOM structure to at least one web server for comparison with a deemed clean representation of the DOM structure of the transformed web application code at the server.

12. The method of claim 11 further comprising displaying at least one of a visual alert or an audio notification in case a tampering event is detected.

13. A web application protection system of a server configured to detect and mitigate security attacks on a web application code, the system comprising:

a communication interface to intercept the web application code sent to a web server via a network;

a processor configured to:

build a deemed clean representation of a DOM structure of an intercepted web application code;

embed at least one script with the intercepted web application code to produce the transformed web application code, wherein the at least one script triggers a loop to collect and send one or more client document object model (DOM) structures of the transformed web application code at least once when executed on the client;

compare at least one representation of at least one client DOM structure received from a client with the deemed clean representation of the DOM structure, wherein the at least one representation of the at least one DOM structure is received subsequent to the execution of a transformed web application code on the client; and determine one or more tampering events that signify one or more security threats to the transformed web application code based upon the comparison.

14. A web application protection system of a server configured to detect and mitigate security attacks on a web application code, the system comprising:

a communication interface to intercept the web application code sent to a web server via a network;

a processor configured to:

build a deemed clean representation of a DOM structure of an intercepted web application code;

embed at least one script with the intercepted web application code to produce the transformed web application code, wherein the at least one script triggers a loop to collect and send one or more representations of client document object model (DOM) structures of the transformed web application code at least once when executed on the client;

compare at least one representation of at least one client DOM structure received from a client with the deemed clean representation of the DOM structure, wherein the at least one representation of the at least one DOM structure is received subsequent to the execution of a transformed web application code on the client; and determine one or more tampering events that signify one or more security threats to the transformed web application code based upon the comparison.

15. The system of claim 14, wherein the communication interface comprises one or more of a reverse proxy interface, a collaborating proxy interface or a remote proxy interface.

16. The system of claim 14, wherein the processor is further configured to merge one or more variations produced to the deemed clean representation of the DOM structure.

17. The system of claim 14, wherein the processor is further configured to share one or more variations ignored in the at least one representation of the at least one DOM structure received from the client across different installations of a server component.

18. The system of claim 14, wherein the processor is further configured to notify at least one of the web server or the client in case one or more tampering event is determined.

19. The system of claim 18, wherein the processor is further configured to notify at least one of the web server or the client in case even if one representation of the at least one client DOM structure is not received from the client.

* * * * *